United States Patent [19]

Stephenson et al.

[11] 3,938,755

[45] Feb. 17, 1976

[54] VEHICLE SENSITIVE RETRACTOR WITH ENCLOSED DOUBLE PENDULUM

[75] Inventors: Robert L. Stephenson, Sterling Heights; Robert C. Pfeiffer, Rochester; Yogendra Singh Loomba, Washington, all of Mich.

[73] Assignee: Allied Chemical Corporation, New York, N.Y.

[22] Filed: July 10, 1974

[21] Appl. No.: 487,330

[52] U.S. Cl. ......................................... 242/107.4 A
[51] Int. Cl.[2] ...................................... B65H 75/48
[58] Field of Search ........... 242/107.4, 107 SB, 107; 280/150 SB; 297/388

[56] References Cited
UNITED STATES PATENTS

| | | | |
|---|---|---|---|
| 3,489,367 | 1/1970 | Kovacs et al. ................. | 242/107.4 |
| 3,552,676 | 1/1971 | Weber ............................ | 242/107.4 |

*Primary Examiner*—Leonard D. Christian
*Attorney, Agent, or Firm*—John P. Kirby, Jr.

[57] ABSTRACT

The vehicle-sensitive retractor has an upper pendulum assembly and a lower pendulum assembly. The upper pendulum assembly includes a trunnion, a swivel axis for the trunnion, a support member for the trunnion, and a pendulum housing which is attached to the trunnion and is part of the upper pendulum assembly. The lower pendulum assembly includes a pendulum head, a pendulum rod and a pendulum weight. The trunnion of the upper pendulum assembly has an aperture in its bottom central portion through which the pendulum rod of the lower pendulum assembly extends. The trunnion has a circular support edge upon which the pendulum head of the lower pendulum assembly is disposed for pivoting movement. The trunnion is adapted to pivot in two directions upon its swivel axis with reference to the support member. The lower pendulum assembly and the upper pendulum assembly form a double pendulum mechanism. The upper pendulum assembly is adjustable to a variety of operable static positions in one plane according to the position in which the retractor is installed in the vehicle. The retractor may be tilted for installation without having to redesign the pendulum assembly and support assembly.

6 Claims, 3 Drawing Figures

VEHICLE SENSITIVE RETRACTOR WITH ENCLOSED DOUBLE PENDULUM

BACKGROUND OF THE INVENTION

1. Field of the Invention

This invention relates to safety belt retractors for occupants of vehicles, such as automobiles. More particularly, this invention relates to an inertia responsive safety belt retractor which is vehicle-sensitive. Such a retractor is responsive to acceleration, deceleration or change in orientation of the vehicle, which may result from cornering, braking or overturning of the vehicle. In response thereto, the retractor locks to prevent further withdrawal of the safety belt. Still more particularly, this invention relates to an improved, universal inertia mechanism and support assembly which allow the retractor to be placed in a variety of positions within the vehicle.

2. Description of the Prior Art

Vehicle sensitive safety belt retractors have been recently developed which should significantly decrease the number of fatalities and serious injuries resulting from motor vehicle accidents. Most of these retractors use a vehicle sensitive mechanism having a pendulum assembly. Typically, such retractors also include a belt reel which is continually biased in a retracting direction and a pawl which is engagable with a ratchet wheel on the belt reel. When the pendulum assembly is displaced from its normally vertical position by acceleration, deceleration of change in orientation of the vehicle, the pendulum assembly moves the pawl into engagement with the ratchet wheel, preventing further withdrawal of the belt. U.S. Pat. application Ser. No. 312,534 filed Dec. 6, 1972 in the name of Lon E. Bell discloses an example of such a retractor.

It is important for the pendulum assembly to be in a substantially vertical position prior to actuation by acceleration, deceleration or change in orientation of the vehicle, so that the safety belt can be moved without locking the belt reel. It is desirable to have an improved, universal pendulum assembly and support assembly which are adjustable and do not need to be redesigned for different vehicles in order to have the pendulum assembly disposed vertically in its static position prior to actuation. This is desirable because the retractor needs to be mounted in various positions and various orientations within different vehicles. Sometimes the retractor needs to be turned partly on its side, or tilted, such as when it is mounted on the back of the front seat in a vehicle.

SUMMARY OF THE INVENTION

The retractor of this invention is vehicle-sensitive and inertia-operated. The retractor has a reel for winding a safety belt, means to lock the reel and thereby restrain an occupant of the vehicle during emergency situations, an improved inertia mechanism, an improved support mounted on the retractor for supporting the inertia mechanism and an improved actuating means responsive to the inertia mechanism for operating the means for locking the reel. The inertia mechanism is a lower pendulum assembly which includes a pendulum head in contact with the actuating means. The support for the lower pendulum assembly includes a trunnion, a swivel axis for the trunnion, a support member for the trunnion and a pendulum housing which is attached to the trunnion and forms part of the upper pendulum assembly. The trunnion has a substantially circular support edge upon which the pendulum head is disposed. The lower pendulum assembly is adapted to pivot upon the support edge in any lateral direction. The upper pendulum assembly is adjustable to a variety of operable static positions in one plane according to the position in which the retractor is oriented by virtue of installation in the vehicle. The swivel axis for the trunnion is adapted to allow the trunnion to pivot in two lateral directions in one plane. The support member is adapted to support the trunnion. The pendulum housing is attached to the trunnion and forms a part of the upper pendulum assembly.

The trunnion may be any concave vessel having an aperture in its bottom central portion through which a pendulum rod extends. As a result, the retractor has two separate pivoting actions: (1) the pivoting action between the lower pendulum assembly and the trunnion; and (2) the pivoting action between the trunnion and the support member. The lower pendulum assembly and upper pendulum assembly comprise a double pendulum mechanism. In response to inertia forces during dangerous situations, the lower pendulum assembly may pivot in an infinite variety of lateral directions.

The actuating means is disposed above the pendulum head. Typically, the reel locking means includes one or more ratchet wheels and a pawl, although other reel locking means may also be used. The actuating means is an actuating post which has an unlocked position and a locked position. The actuating means remains disposed in the unlocked position when the upper pendulum assembly is pivoted to any one of its variety of operable static positions. The actuating means is moved to the locked position by movement of the lower pendulum assembly during emergency situations to engage the pawl in the ratchet wheels to lock the reel and prevent further unwinding of the belt from the reel.

The retractor has a longitudinal axis. The trunnion and upper pendulum assembly have a longitudinal axis which is approximately perpendicular to the swivel axis for the trunnion. The static position of the upper pendulum assembly is adjustable automatically in two lateral directions in one plane from a static position wherein the longitudinal axis of the upper pendulum assembly is disposed at an angle of approximately 0° to an angle of approximately 30° with reference to the longitudinal axis of the retractor. The static position of the lower pendulum assembly is automatically adjustable with the upper pendulum assembly because the lower pendulum assembly is supported by the upper pendulum assembly and because under static conditions the upper and lower pendulum assemblies act as one unit. In event of sudden movement of the vehicle, the lower pendulum assembly is adapted to pivot with reference to the upper pendulum assembly in any lateral direction. The retractor further includes a support structure including two parallel side walls and a back wall. The support member for the trunnion is disposed between the side walls. The inertia mechanism and support are universal and unique because they do not have to be redesigned for use in different vehicles in order to have the lower pendulum assembly disposed substantially vertical for the purpose of allowing the retractor to remain unlocked in normal operation. If the retractor is turned partly on its side, that is, tilted for installation, the static position of the lower pendulum assembly is automatically adjustable to such tilted installation of the retractor and enables the lower pendulum assembly to be disposed substantially vertically.

DETAILED DESCRIPTION

Figure 1:
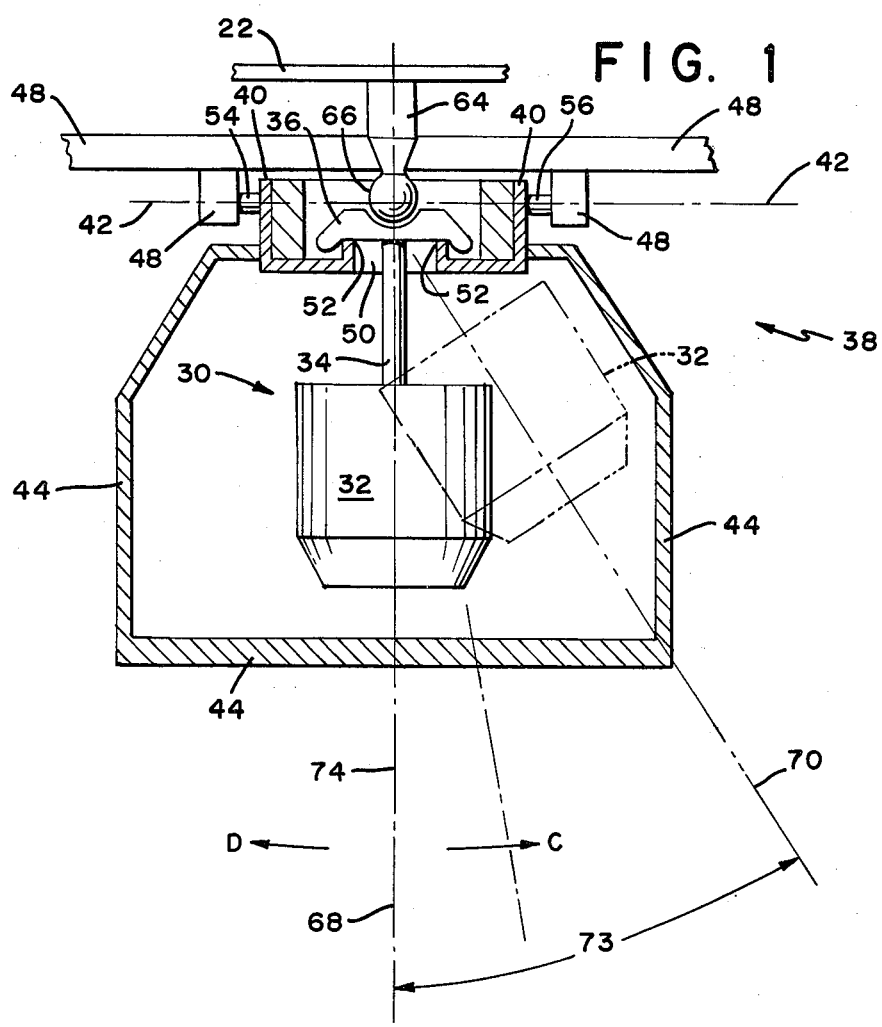
FIG. 1 is a partial cross-sectional view of the improved inertia mechanism, support assembly and actuating means.

The retractor in which the improved inertia mechanism, support assembly and actuating means are adapted to be used is disclosed in co-pending U.S. Pat. application Ser. No. 487,329, entitled "Vehicle Sensitive Retractor with Double Pendulum," filed on July 10, 1974 in the name of the same inventors, R. L. Stephenson, R. Pfeiffer and Y. Loomba. The retractor has a reel means, including a reel shaft, rotatably mounted on a support means. The support means is a load bearing member and includes two side walls and a back wall. The support means also includes a mounting means in the form of a rigid extension adapted to be bolted or otherwise secured to an anchorage point in a vehicle.

A belt is adapted to be attached to the reel shaft for winding and unwinding thereon. The reel means includes a biasing means, such as a tension return spring, inside a housing, which urges the reel shaft to turn in a winding direction. The winding direction of the reel shaft retracts the belt into the retractor. The opposite unwinding direction of the reel shaft allows withdrawal of the belt from the retractor.

The two side walls of the support structure are disposed substantially parallel to one another and substantially perpendicular to the back wall. The support structure also includes a cross member extending between the side walls and at the opposite side of the side walls from the back wall. The retractor further includes a means for locking the reel means, such as a pawl and a ratchet means. The ratchet means includes at least one ratchet wheel and, preferably, two ratchet wheels. The ratchet wheels have ratchet teeth on their outer circumferences and are fixedly mounted on the reel shaft. The pawl is pivotally mounted on the side walls and extends between the side walls. The pawl is adapted to pivot from an unlocked position to a locked position. In the locked position, the pawl is pivoted into engagement with teeth of the ratchet wheels.

The retractor further includes an inertia mechanism, a support for the inertia mechanism and an actuating means, all of which are adapted to cooperate to actuate the pawl from its unlocked position to its locked position during emergency situations. The inertia mechanism, support mechanism and actuating means may be mounted inside the retractor, or may be mounted outside the retractor on the outer side of one of the side walls of the support structure. The inertia mechanism is a lower pendulum assembly, indicated generally by the numeral 30, in FIG. 1. The lower pendulum assembly 30 includes a pendulum weight 32, a pendulum rod 34 and a pendulum head 36. The pendulum rod 34 has an upper end and a lower end. The upper end of the pendulum rod 34 is connected to the pendulum head 36. The lower end of the pendulum rod is connected to the pendulum weight 32.

The support for the pendulum assembly 30 is an upper pendulum assembly (indicated generally by the numeral 38 in FIG. 1) which includes a trunnion 40, a swivel axis 42 for the trunnion 40, a pendulum housing 44, and a support member 48 for the trunnion 40. The trunnion 40 may be any concave vessel, such as a vessel having either a cylindrical shape, or a cup shape, or an inverted dome shape, or an inverted conical shape. The pendulum rod 34 of the lower pendulum assembly 30 extends from the pendulum head 36 through an aperture 50 in a bottom central portion of the trunnion 40. The trunnion 40 has an upturned, substantially circular support edge 52 around the circumference of the aperture 50. The pendulum head 36 is disposed on the support edge 52 within the trunnion 40.

Figure 2:
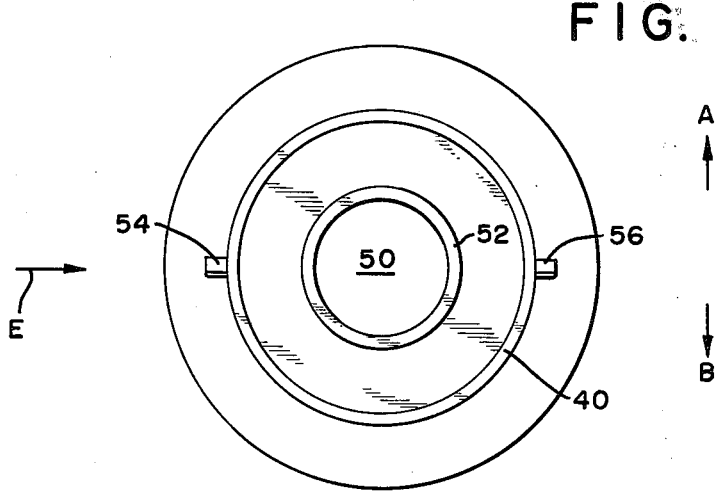
FIG. 2 is a top view of part of FIG. 1 showing the pendulum housing.

The swivel axis 42 for the trunnion 40 is formed by two aligned axles 54 and 56, one axle on each of two opposing sides of the trunnion 40. The swivel axis 42 for the trunnion 40 is substantially parallel to a longitudinal axis of the reel. The axles 54 and 56 of the trunnion 40 extend into and are journaled in the support member 48. The support member 48 is fixedly mounted on and between the side walls and supports the support assembly 38 and the pendulum assembly 30. The trunnion axles 54 and 56 enable the trunnion 40 to pivot with reference to the support member 48 in one plane in two lateral directions (indicated by arrows A and B in FIG. 2) substantially perpendicular to the support member 48.

The pendulum housing 44 is attached to the lower part of the trunnion 40 and encourages the pivoting motion of the trunnion 40. The pendulum housing 44 of the upper pendulum assembly 38 is hollow and encloses the pendulum rod 34 and pendulum weight 32 of the lower pendulum assembly 30. There is enough room inside the pendulum housing 44 so that the pendulum weight 32 can pivot to at least a 30° angle from the vertical plane. The pendulum housing 44 pivots with the trunnion 40. The trunnion 40 pivots independently of the lower pendulum assembly 30. As a result, the retractor has two pendulum mechanisms; one pendulum mechanism being lower pendulum assembly 30 and the second pendulum mechanism being upper pendulum assembly 38 which includes trunnion 40. Thus, the retractor has two separate pivoting actions: The first pivoting action is between the lower pendulum assembly 30 and the trunnion 40. The pendulum head 36 pivots on the substantially circular support edge 52 which allows the lower pendulum assembly 30 to pivot in an infinite variety of lateral directions. The second pivoting action is between the trunnion 40 and the support member 48. The trunnion 40 and pendulum housing 44 pivot in two directions in one plane by means of swivel axis 42 with reference to support member 48.

The actuating means is actuating post 64 disposed above the pendulum head 36. The post 64 is connected to the means of locking the retractor. Preferably, the post 64 is connected to the lower side of the pawl 22 and the post 64 has a rounded portion 66 at its lower end which rests on the pendulum head 36. If the lower pendulum assembly 30 and upper pendulum assembly 38 are mounted on the outer side of one of the side walls 10 of the support structure 8, the pawl 22 must extend through such side wall 10 to be actuated by the actuating post 64 or the pawl 22 and ratchet wheel can also be mounted on the outer side of one of the side walls 10.

The trunnion 40 and pendulum housing 44 have a longitudinal axis 68 passing through the center of aperture 50 of trunnion 40. The longitudinal axis 70 of the lower pendulum assembly 30 in its static position is substantially parallel and coincident with the longitudinal axis 68 of the trunnion 40 and pendulum housing 44. The static position of the trunnion 40 and pendulum housing 44 is adjustable in one plane in two opposing lateral directions, indicated by arrows A and B in FIG. 2, which are substantially perpendicular to the support member 48, from a static position wherein the longitudinal axis 68 of the trunnion 40 and pendulum housing 44 is disposed at an angle of 0° up to approximately 30° or any angle in between 0° and approximately 30° with reference to the longitudinal axis 74 of the retractor or an axis substantially parallel to the axis 74 of the retractor.

When the retractor is disposed in the vehicle so that the longitudinal axis of the retractor is substantially vertical, the trunnion 40, pendulum housing 44 and pendulum assembly 30 assume an operable static position with the angle between both the longitudinal axis 68 of the trunnion 40 and pendulum housing 44 and the longitudinal axis 70 of the pendulum assembly 30 being 0° with reference to the longitudinal axis of the retractor. When the retractor 2 is tilted in a direction substantially perpendicular to the support member 48, that is, a direction indicated by arrows A or B in FIG. 2, and the longitudinal axis of the retractor is at an angle of up to approximately 30° with the vertical plane, the trunnion 40 and pendulum assembly 30 assume an operable static position with the longitudinal axis 68 of the trunnion 40 and pendulum housing 44 and the longitudinal axis 70 of the pendulum assembly 30 disposed at an angle of up to approximately ° with reference to the longitudinal axis of the retractor.

Figure 3:
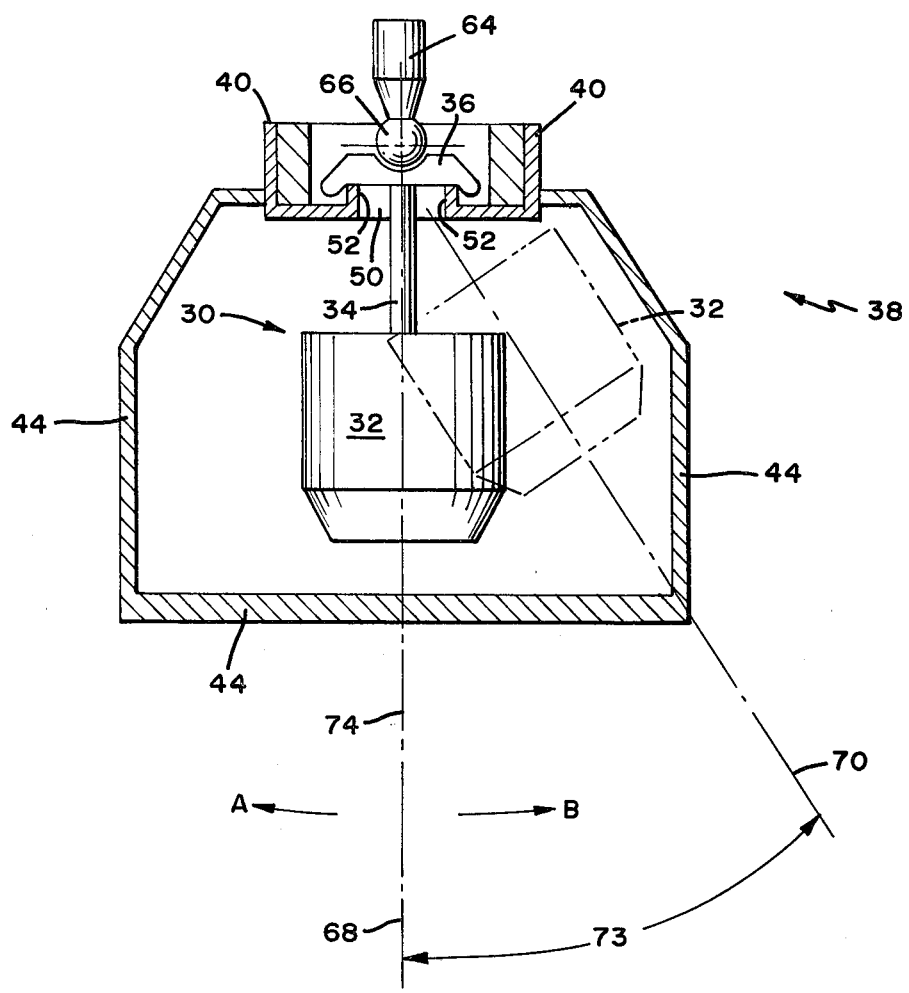
FIG. 3 is a side view of FIG. 2 in the direction of arrow E in FIG. 2.

Referring to FIG. 1, if the retractor were tilted in a direction substantially parallel to the swivel axis 42 of the trunnion 40 and the support member 48, that is, a direction indicated by arrows C or D in FIG. 1, the longitudinal axis 68 of the trunnion 40 would remain substantially parallel to the longitudinal axis of the retractor because the trunnion 40 has no axis of axles upon which to pivot in these directions with reference to the support member 48. The retractor is not tilted in the directions C or D for installation in the vehicle. In contrast, referring to FIGS. 2 and 3, when the retractor is tilted in a direction substantially perpendicular to the swivel axis 42 of the trunnion 40 and the support member 48, that is, a direction indicated by arrows A or B, the longitudinal axis 68 of the trunnion 40 does not remain substantially parallel to the longitudinal axis of the retractor. Instead, the longitudinal axis 68 of the trunnion 40, the pendulum housing 44, and the lower pendulum assembly 30 tends to remain substantially parallel to the vertical plane because the trunnion 40 has a swivel axis 42 and swivel axles 54 and 56 upon which to pivot.

The lower pendulum assembly 30 and upper pendulum assembly 38 acting together as one unit are capable of being adjusted automatically to a variety of operable static positions. In all of the variety of operable static positions, the longitudinal axis 70 of the pendulum assembly 30 adjusts to a position approximately parallel to the vertical plane. It is the longitudinal axis of the retractor that assumes an angle with reference to the vertical plane. This adjustment of the trunnion 40 and lower pendulum assembly 30 takes place automatically by means of the pivoting action between the trunnion 40 and the pendulum assembly 30 with reference to support member 48 in two directions. As a result, the retractor may be installed in a vehicle in a tilted configuration of up to 30° with reference to the vertical plane in directions A or B.

During normal operation of the retractor after installation, when the vehicle is not in a dangerous situation, the pendulum head 36 continues to rest on the support edge 50. During normal operation of the retractor, when the vehicle is not in a dangerous situation, the pawl actuating post 64 rests in its unlocked position on top of the pendulum head 36. the actuating post 64 is connected to the underside of the pawl 22 and the pawl 22 remains in its unlocked position. FIG. 1 shows the pendulum assembly 30 in its extreme static position in phantom by dashed lines.

When sudden movement of the vehicle, such as acceleration or deceleration exceeds a predetermined magnitude or there is a change in orientation of the vehicle, such as a result of overturning or tilting of the vehicle while negotiating a curve, the pendulum head 36 is lifted up and off the support edge 50. Such movement of the pendulum head 36 lifts the actuating post 64, which in turn lifts pawl 22, causing the pawl 22 to pivot into engagement with the ratchet wheels. Such engagement of the ratchet wheel may occur when the lower pendulum assembly 30 swings independently of the trunnion 40 in any lateral direction, such as the direction of C or D in FIG. 1 or in the direction A or B in FIGS. 2 and 3.

The lower pendulum assembly 30, trunnion 40 and support member 48 provide a simple, but effective, vehicle-sensitive, inertia-operated mechanism adapted to lock the retractor and thereby restrain an occupant of the vehicle during emergency situations. As a result, when the vehicle is subjected to sudden braking, cornering, or overturning, for example, the lower pendulum assembly 30 causes the ratchet wheels to prevent the belt from being withdrawn any further from the retractor, thereby restraining the occupant of the vehicle wearing the safety belt. The lower pendulum assembly 30, trunnion 40, and support member 43 are highly reliable in operation and inexpensive to manufacture. A typical location for this retractor is on the back of the front seat of a vehicle where the angle of orientation of the retractor changes with the position to which the seat is adjusted.

We claim:

1. In a vehicle-sensitive, inertia operated safety belt retractor having a reel for winding a safety belt, means to lock the reel and thereby restrain an occupant of the vehicle during dangerous situations, an inertia mechanism, a support mounted on said retractor for supporting the inertia mechanism and an actuating means responsive to said inertia mechanism for operating the means for locking the reel; the improvement wherein:

said inertia mechanism is a lower pendulum assembly which includes a pendulum head in contact with said actuating means, said pendulum assembly being actuated by forces exceeding a predetermined magnitude resulting from a sudden change in the motion or orientation of the vehicle, said actuation means operating directly on the means for locking the reel without any intermediate mechanism disposed structurally or operatively between said actuating means and said means for locking the reel; and said support for said lower pendulum assembly is an upper pendulum assembly which includes: a trunnion which is a concave vessel having a substantially circular support edge upon which said pendulum head is disposed, said lower pendulum assembly being adapted to pivot upon said support edge in any lateral directions, said pendulum assembly requiring a force exceeding a predetermined magnitude to lift a part of the pendulum head up and off a part of said support edge before said lower pendulum assembly will cause said locking means to lock the reel;

said upper pendulum assembly being adjustable to a variety of operable static positions in one plane with reference to said retractor according to the position in which the retractor is oriented by virtue of installation in the vehicle; a swivel axis for said trunnion adapted to allow said trunnion to pivot in two lateral directions in one plane; a support member for said trunnion; and a pendulum housing which is attached to the trunnion; said inertia mechanism and said support having a compact configuration, sufficiently compact for said pendulum assembly and said gimbal assembly to be mounted either within said retractor or outside said retractor.

2. The vehicle-sensitive, inertia-operated safety belt retractor according to claim 1 wherein:

said actuating means is an actuating post disposed above said pendulum head of said lower pendulum assembly, said actuating post being connected to said means for locking said reel, said actuating post being disposed in an unlocked position when said lower pendulum assembly is at rest and said actuating post being moved to said locked position by said lower pendulum assembly during dangerous situations to lock said reel and prevent further unwinding of said belt.

3. The vehicle-sensitive, inertia-operated safety belt retractor according to claim 1 wherein:

said trunnion further comprises two swivel axles disposed on opposing sides of said trunnion, said swivel axles forming said trunnion swivel axis upon which said trunnion pivots in two lateral directions, said swivel axles being disposed in said support member.

4. The vehicle-sensitive, inertia-operated safety belt retractor according to claim 1 wherein:

said retractor and said trunnion each have a longitudinal axis;

said upper pendulum assembly has a longitudinal axis which is approximately perpendicular to the swivel axis for the trunnion; and said upper pendulum assembly is adjustable in the two lateral directions in which said trunnion pivots from a static position wherein said longitudinal axis of said trunnion is disposed at an angle of approximately 0° to an angle of approximately 30° with reference to an axis substantially parallel to the longitudinal axis of said retractor.

5. The vehicle-sensitive, inertia-operated safety belt retractor according to claim 1 wherein:

said lower pendulum assembly further includes a pendulum weight and a pendulum rod;

said pendulum rod has an upper end and a lower end, said upper end of said pendulum rod being connected to said pendulum head, said lower end of said pendulum rod being connected to said pendulum weight; and said trunnion is a cylindrical vessel having a bottom central portion and an aperture in said bottom central portion, said circular support edge being disposed around said aperture, said pendulum rod being disposed through said aperture.

6. The vehicle-sensitive, inertia-operated safety belt retractor according to claim 1 wherein:

said retractor has a support structure which includes side walls;

said support member is mounted between said side walls; and said pendulum housing extends from said gimbal and encloses said pendulum, said pendulum housing being adapted to encourage pivoting action of said gimbal.

* * * * *